US008250621B2

(12) United States Patent  
Cha

(10) Patent No.: US 8,250,621 B2  
(45) Date of Patent: Aug. 21, 2012

(54) BROADCASTING RECEIVER AND METHOD FOR UPGRADING FIRMWARE

(75) Inventor: Sang Hoon Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 1325 days.

(21) Appl. No.: 11/520,793

(22) Filed: Sep. 14, 2006

(65) Prior Publication Data

US 2007/0067820 A1    Mar. 22, 2007

(30) Foreign Application Priority Data

Sep. 14, 2005  (KR) .................. 10-2005-0085803

(51) Int. Cl.  
*H04N 7/173* (2006.01)

(52) U.S. Cl. .................... 725/132; 725/140; 717/168

(58) Field of Classification Search .................. 725/131, 725/132, 139, 140, 151, 152; 714/48; 717/168  
See application file for complete search history.

(56) References Cited

U.S. PATENT DOCUMENTS

| 6,166,730 | A * | 12/2000 | Goode et al. ............ 715/716 |
| 6,888,888 | B1 | 5/2005 | Tu et al. |
| 6,971,095 | B2 * | 11/2005 | Hirai et al. ............ 717/173 |
| 7,369,750 | B2 * | 5/2008 | Cheng et al. ............ 386/83 |
| 2004/0230963 | A1 * | 11/2004 | Rothman et al. ............ 717/168 |
| 2005/0073613 | A1 * | 4/2005 | Potrebic et al. ............ 348/731 |
| 2005/0144651 | A1 * | 6/2005 | Prus et al. ............ 725/134 |
| 2005/0147247 | A1 | 7/2005 | Westberg et al. |
| 2006/0059391 | A1 * | 3/2006 | Park ............ 714/48 |

FOREIGN PATENT DOCUMENTS

| WO | WO 01/47250 A2 | 6/2001 |
| WO | WO 02/05560 A2 | 1/2002 |

OTHER PUBLICATIONS

"OpenCable_HOST-POD Interface Specification"; Dec. 21, 2001.*  
Host-POD Interface Standard-ANSI/SCTE 28 2004, Jan. 1, 2004.*  
Society of Cable Telecommunications Engineers, Inc.: "American National Standard ANSI/SCTE 28 2004 Host-POD Interface Standard" [Online] 2004, Society of Cable Telecommunications Engineers, Inc., Exton, PA, USA—XP002413348.

* cited by examiner

*Primary Examiner* — Scott Beliveau  
*Assistant Examiner* — Alan Luong  
(74) *Attorney, Agent, or Firm* — McKenna Long & Aldridge LLP

(57) ABSTRACT

A broadcasting receiver and a method for upgrading firmware of a cable card are disclosed. When firmware upgrading of the cable card is completed and a reset request is transmitted from the cable card to a host, if an application which is being executed is affected by rebooting of the cable card, the host defers the reset, so that a user can normally use the existing application service through the cable broadcasting receiver.

17 Claims, 6 Drawing Sheets

FIG. 1

| Syntax | # of bits | Mnemonic |
|---|---|---|
| Firmware_upgrade_complete() {     firmware_upgrade_complete_tag     length_field()     reset_request_status } | 24<br><br>8 | uimsbf<br><br>uimsbf |

FIG. 2

| reset_request_status field | meaning |
|---|---|
| 0x00 | PCMCIA reset |
| 0x01 | Card reset(POD reset) |
| 0x02 | No reset-Normal Operation continues |
| 0x03 | Deferred reset with PCMCIA reset |
| 0x04 | Deferred reset with Card reset |

FIG. 4

| Inband Tuner ID | Inband Tuner #1 | Inband Tuner #2 | Inband Tuner #3 |
|---|---|---|---|
| Occupancy status | Used | Valid | Used |
| Victim Priority | 4 | 0 | 2 |
| Application ID | 04(DVR Recording) | None | 01(Cable Channel) |

FIG. 5

| Application ID | Application | Victim Priority |
|---|---|---|
| 00 | Reserved | Reserved |
| 01 | Cable Channel | 2 |
| 02 | PIP | 1 |
| 03 | VOD/AOD | 5 |
| 04 | DVR Recording | 4 |
| 05 | 1394 Output | 3 |
| 06 | Reserved | Reserved |

BROADCASTING RECEIVER AND METHOD FOR UPGRADING FIRMWARE

This application claims the benefit of Korean Application No. 10-2005-0085803, filed on Sep. 14, 2005, which is hereby incorporated by reference as if fully set forth herein.

BACKGROUND OF THE INVENTION

1. Field of the Invention

The present invention relates to a broadcasting receiver, and more particularly, to a method for upgrading firmware in a cable broadcasting receiver.

2. Discussion of the Related Art

A cable broadcasting receiver selling in North America, such as an open cable digital TV and a cable ready digital TV, needs a cable card provided from a corresponding cable provider. The cable card is referred to as a point of deployment (POD) module. Hereinafter, the POD module and the cable card will be used together to refer to the same thing.

A main body to which the cable card is inserted is referred to as a host. In other words, the cable card and the main body are commonly referred to as a cable broadcasting receiver. The cable card is designed to be detachably fixed to a main body slot of the cable broadcasting receiver.

In order to avoid inefficiency occurring in upgrading firmware by collecting cable cards lent to users who view cable broadcasting, there is provided a method for upgrading firmware of the cable cards in real time in a state that the cable cards are distributed to the users. This method uses a quadrature phase shift keying (QPSK) out-of-band (OOB) channel or a quadrature amplitude modulation (QAM) inband channel on a cable network (i.e., cable line) to transmit firmware of a cable card. In other words, an inband tuner or OOB tuner of a digital cable broadcasting receiver is used as a medium in order to upgrade firmware of the cable card.

The method for upgrading firmware of a cable card can be divided into an immediate upgrading method and a delayed upgrading method.

The immediate upgrading method is to upgrade firmware of a cable card regardless of a power-on or stand-by state of a cable broadcasting receiver when a cable broadcasting station desires to upgrade it. This method allows a user to recognize that firmware of the cable card is being upgraded using an inband tuner in a power-on state of the cable broadcasting receiver.

The delayed upgrading method is to upgrade firmware of a cable card only in a stand-by state of a cable broadcasting receiver without upgrading it in a power-on state of the cable broadcasting receiver.

SUMMARY OF THE INVENTION

Accordingly, the present invention is directed to a cable broadcasting receiver and a method for upgrading firmware of a cable card, which substantially obviate one or more problems due to limitations and disadvantages of the related art.

An object of the present invention is to provide a cable broadcasting receiver and a method for upgrading firmware of a cable card, in which an application being executed is not affected by firmware upgrading of the cable card within the limits of the possible.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a cable broadcasting receiver according to the present invention includes a plurality of inband tuners, and a host provided with a controller selecting one of the inband tuners if a firmware upgrading request is input, receiving firmware images through the selected inband tuner to transmit the received firmware images to a source which has requested firmware upgrading, and deferring a reset of the source for a predetermined time depending on a type of an application, which is being currently executed, if the reset is requested from the source.

The requested reset is either immediate reset or deferred reset.

If the requested reset corresponds to the deferred reset and the operation of the application is affected by the reset of the source, the controller reboots the source by executing the requested reset at the time when the operation of the application is completed.

If the requested reset corresponds to the deferred reset and the operation of at least one of applications, which are being executed while occupying each inband tuner, is affected by the reset of the source, the controller reboots the source by executing the requested reset at the time when the corresponding applications are completely operated.

If the requested reset corresponds to the deferred reset and an application scheduled to be operated for the reset of the source exists, the controller reboots the source by executing the requested reset at the time when the operation of the application is completed.

If firmware upgrading is completed, the source determines either the immediate reset or the deferred reset on the basis of importance of the upgraded firmware and requests the determined reset from the host.

The source includes a cable card.

If the firmware upgrading request is input, the controller selects an inband tuner, which is not occupied by the application, among the inband tuners as an available inband tuner, and receives the firmware images through the selected inband tuner.

If it is determined that there is no available inband tuner, the controller selects an inband tuner on the basis of importance of applications which occupy the inband tuners, and receives the firmware images through the selected inband tuner.

In another aspect of the present invention, a method for upgrading firmware of a cable broadcasting receiver, which includes a plurality of inband tuners, includes receiving firmware images through one of the inband tuner if a firmware upgrading request is input, to transmit the received firmware images to a source which has requested firmware upgrading, and deferring a reset of the source for a predetermined time depending on a type of an application, which is being currently executed, if the reset is requested from the source.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates one example of a firmware upgrading complete syntax transmitted from a cable card according to the preferred embodiment of the present invention;

FIG. 2 illustrates one example of a reset request status field value of FIG. 1;

FIG. 4 illustrates one example of a matrix that manages a status of an inband tuner according to the preferred embodiment of the present invention;

FIG. 5 illustrates one example of victim priority and ID of an application that occupies an inband tuner in accordance with the preferred embodiment of the present invention.

DETAILED DESCRIPTION OF THE INVENTION

Figure 3A:
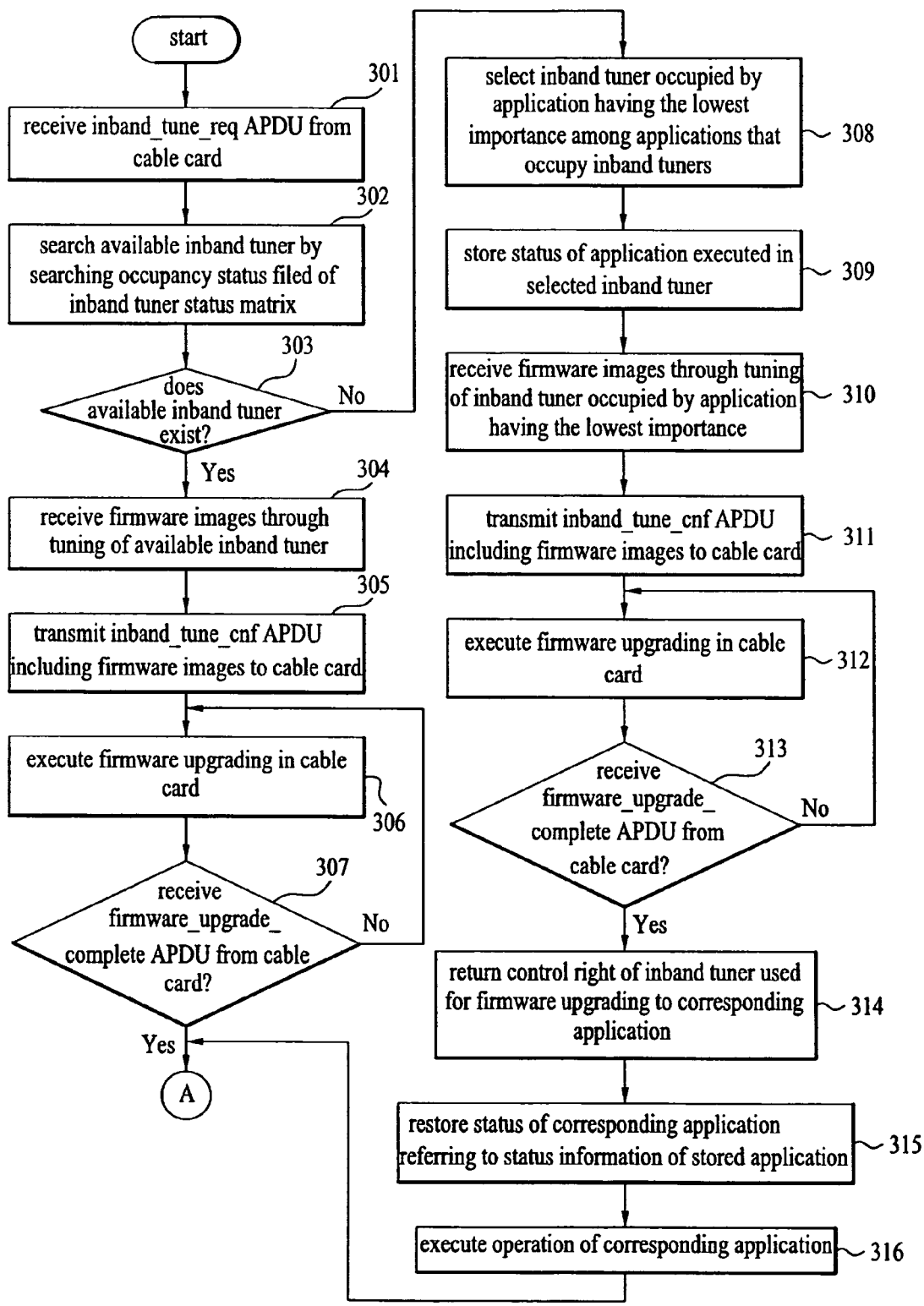
FIG. 3A is a flow chart illustrating the operation when firmware upgrading is requested from a cable card according to the preferred embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

General terms are used in the present invention. However, in specific cases, terms considered to be the most suitable ones by the applicant are selectively used. In this case, the terms would be defined clearly in a corresponding description part. Therefore, the terms used in the present invention should be understood as their meaning not their title.

Recently, cable broadcasting providers lead users to use functions such as video on-demand (VOD), audio on-demand (AOD), and digital video recorder (DVR) in addition to static viewing of cable broadcasting. The VOD, AOD, and DVR functions and the cable broadcasting are referred to applications.

When a cable broadcasting station according to the present invention desires to upgrade firmware of a cable card, the cable card transmits an inband tuning request (inband_tune_req APDU) to a host to allow an inband tuner of the host to try tuning using a frequency for firmware images.

The host which has received the inband tuning request selects an available one of a plurality of inband tuners, or selects a victim inband tuner if there is no available tuner.

Subsequently, after receiving the firmware images transmitted from a head end through the selected inband tuner, the host continues to upgrade firmware of the cable card until the firmware is completely upgraded. The applications that occupy other inband tuners are normally operated while the firmware of the cable card is being upgraded.

The available inband tuner means an inband tuner that is not occupied by the applications. The victim inband tuner means that an inband tuner that is occupied by an application having the highest victim priority among the applications that occupy the inband tuners.

If the firmware images of the cable card are all transmitted to the cable card through the available inband tuner or the victim inband tuner, the cable card transmits a firmware upgrading complete signal (firmware_upgrade_complete( ) APDU) to the host.

At this time, the firmware upgrading complete signal of the cable card includes a reset request.

The host reboots the cable card in accordance with the reset request. In other words, the reset request is to reboot the cable card in order to replace the firmware images of the existing cable card with downloaded firmware images.

In the present invention, the reset request allows predetermined services occupied by the user to be continuously maintained even after the firmware of the cable card is completely upgraded.

The reset request according to the present invention is divided into immediate reset and deferred reset. The immediate reset is subdivided into hard reset (PCMCIA reset) and soft reset (POD reset or card reset), and the deferred reset is subdivided into deferred hard reset and deferred soft reset.

The difference between the immediate reset and the deferred reset lies in whether to immediately reboot the cable card or reboot the cable card after a predetermined application is executed in case of the reset request from the cable card.

If the hard reset is executed, the cable card returns to a PCMCIA interface that cannot route MPEG data streams any longer. In other words, the hard reset is to initiate software, chips or blocks related a host-cable card interface.

The soft reset is weaker than the hard reset. If the soft reset is executed, all open sessions are closed, and transport connection and operation return to the status immediately after personality change of the cable card. That is, the host-cable card interface related software is initiated. At this time, since the soft reset stops routing change of the MPEG data streams, viewers do not realize any problem unless A/V streams are scrambled.

After firmware upgrading of the cable card is completed, if the cable card is immediately rebooted by the immediate reset, a problem occurs in that the application operation, such as VOD/AOD, pay viewing, or DVR recording, is disconnected or stopped in the middle of the service. This is because that conditional access (CA) and copy protection (CP) functions related to the above application operation are stopped until the cable card is completely rebooted. In other words, if the host resets the cable card, the decryption operation of A/V streams encrypted by CA and CP is stopped while the cable card is being rebooted.

Since these operations are related to billing, user claim may occur due to the above problem. One example of the pay viewing includes a pay per view (PPV) service. The PPV service is a meter rate broadcasting service that allows a subscriber to make a payment per view. The PPV service allows the subscriber to purchase a movie, a program, or an event of single round as a single service, so as to view the service.

For example, it is supposed that a user is viewing a charged movie. At this time, A/V streams of the movie are encrypted, and are displayed through decryption by the cable card. However, if the cable card is rebooted, the A/V streams of the movie are decrypted and thus displayed in a state that they are encrypted. For this reason, the user fails to view the movie well while the cable card is being rebooted.

In the present invention, in order to avoid user claim due to the aforementioned rebooting of the cable card, the cable card requests the deferred reset if the firmware upgrading is completed.

In other words, if the deferred reset is requested from the cable card after the firmware upgrading of the cable card is completed, the host checks whether the application affected by rebooting of the cable card is in service. At this time, if at least one or more applications are in service, rebooting of the cable card is deferred until the corresponding applications are completely executed. In other words, after the applications are completely executed, the cable card is rebooted. In this case, the cable card may be rebooted through the hard reset or the soft reset.

Examples of the applications affected by rebooting of the cable card include viewing of a channel encrypted by CA and CP, PPV, VOD/AOD, and DVR. Since the applications affected by rebooting of the cable card can be used more variously, they will not be limited to the above examples.

In the present invention, a list of applications affected by rebooting of the cable card is previously set. The list of applications can be added or deleted either automatically through downloading from the host or by user's request.

When the deferred reset is requested from the cable card, if even one of the applications in the list occupies the inband tuner and is being operated, the host defers reset until the operation of the corresponding application is completed. If several ones of the applications in the list occupy the inband tuner and are being operated, the host executes reset after the operation of the application having the latest completion time is completed. At this time, if the requested reset is the deferred hard reset, the cable card is rebooted through the hard reset. On the other hand, if the requested reset is the deferred soft reset, the cable card is rebooted through the soft reset.

As another example, the host can check the applications affected by rebooting of the cable card among the applications that occupy the inband tuner and are being operated whenever the deferred reset is requested from the cable card.

The cable card may determine the reset to be transmitted to the host using types of resets transmitted from the head end, or may determine the reset without relying on the head end. At this time, the cable card refers to types and importance of firmware to be upgraded.

FIG. 1 illustrates a syntax structure of a firmware upgrading complete signal transmitted from the cable card to the host when firmware upgrading is completed, wherein the syntax structure includes a firmware_upgrade_complete_tag field and a reset_request_status field.

The firmware_upgrade_complete_tag field displays a unique tag value that can recognize the firmware upgrading complete signal, and the reset_request_status field displays a type of the reset.

In other words, the host allows the cable card to undergo the hard reset or the soft reset depending on the reset_request_status field value. Alternatively, the host allows the cable card to undergo the hard reset or the soft reset after the lapse of a certain time.

FIG. 2 illustrates an example of the reset_request_status field value in the upgrade complete syntax of the cable card according to the present invention, wherein the immediate hard reset is assigned in case of 0x00, the immediate soft reset is assigned in case of 0x01, no-reset is assigned in case of 0x02, the deferred hard reset is assigned in case of 0x03, and the deferred soft reset is assigned in case of 0x04.

The deferred soft reset or the deferred hard reset is to protect the operation of viewing of an encrypted channel, PPV, VOD/AOD, and DVR when firmware upgrading of the cable card is completed.

Accordingly, if the reset_request_status field value is equal to 0x00, the host executes the immediate hard reset to reboot the cable card, and if the reset_request_status field value is equal to 0x01, the host executes the immediate soft reset to reboot the cable card. In other words, if the reset_request_status field value is equal to 0x00 or 0x01, the host immediately executes the reset regardless of the types of the applications that currently occupy the inband tuner.

If the reset_request_status field value is equal to 0x02, the host does not execute the reset, and the applications that occupy the inband tuner are normally operated. In this case, newly downloaded firmware images of the cable card are not replaced with the existing firmware images. For example, the no-reset can be used if firmware upgrading is canceled and the cable card continues to be operated using the existing firmware images.

Meanwhile, if the reset_request_status field value is equal to 0x03, the host executes the deferred hard reset to reboot the cable card, and if the reset_request_status field value is equal to 0x04, the host executes the deferred soft reset to reboot the cable card. In other words, if the reset_request_status field value is equal to 0x03 or 0x04, the host checks whether the applications that are being operated while currently occupying the inband tuner are related to CA and CP and thus affected by rebooting of the cable card. If the applications are affected by rebooting of the cable card, the host defers the hard reset or the soft reset until the operation of the applications is completed. On the other hand, if the applications are not affected by rebooting of the cable card, the host immediately reboots the cable card using the hard reset or the soft reset.

Furthermore, when the reset is requested from the cable card, the host defers rebooting of the cable card until the operation of the application affected by rebooting of the cable card is completed even though the application is not operated or is scheduled to be operated before rebooting of the cable card is ended.

For example, it is supposed that firmware upgrading is completed at one o'clock, p.m., the deferred hard reset is requested, DVR recording is scheduled at one o'clock five minutes, p.m., and the hard reset time is ten minutes. In this case, the host executes the hard reset at the time when the DVR recording is completed even though the deferred hard reset is transmitted at one o'clock, p.m.

Figure 3B:
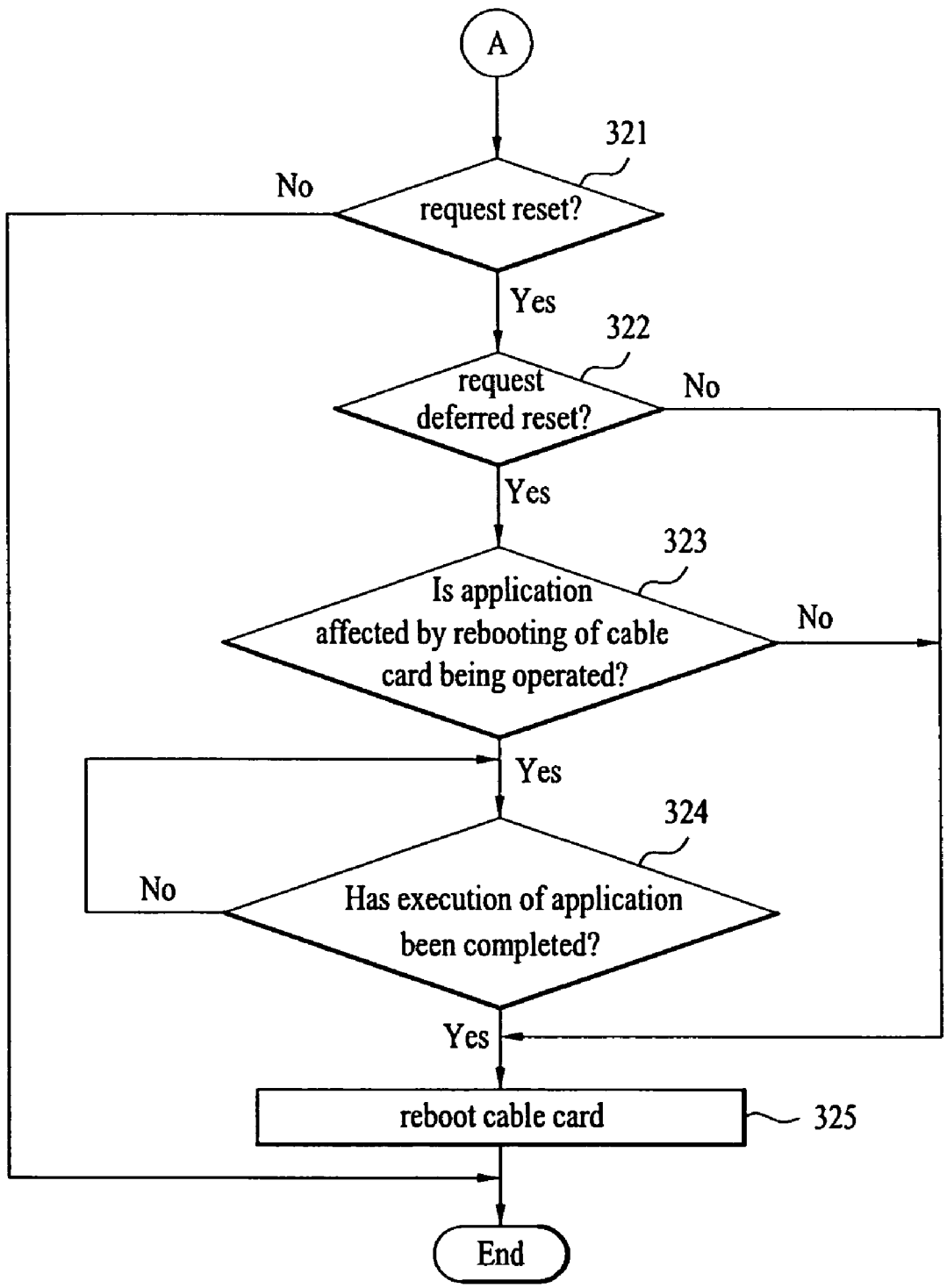
FIG. 3B is a flow chart illustrating the operation after firmware upgrading is completed in accordance with the present invention.

FIG. 3A is a flow chart illustrating the operation when firmware upgrading is requested from the cable card according to the preferred embodiment of the present invention, and FIG. 3B is a flow chart illustrating the operation after firmware upgrading is completed in accordance with the present invention.

FIG. 4 illustrates one example of a matrix that manages a status of the inband tuner according to the preferred embodiment of the present invention, and FIG. 5 illustrates one example of victim priority and ID of the application that occupies the inband tuner in accordance with the preferred embodiment of the present invention.

In other words, if firmware upgrading of the cable card is requested from the cable broadcasting station, the cable card transmits an inband tuning request (inband_tune_req APDU) to the host in order to allow the inband tuner of the host to try tuning using a frequency for the firmware images.

If the inband tuning request is transmitted from the cable card (step 301), the host searches an occupancy status field of the inband tuner status matrix as shown in FIG. 4 (step 302) to check whether the available inband tuner exists (step 303). In FIG. 4, a second inband tuner (inband tuner #2) is used as the available inband tuner.

If it is determined that the available inband tuner exists in step 303, the host selects the corresponding inband tuner (inband tuner #2), and the selected inband tuner (inband tuner #2) executes tuning using the frequency transmitted form the cable card to receive firmware images (step 304). In this case, since the second inband tuner (inband tuner #2) is in use, corresponding field information of the inband tuner status matrix of FIG. 4 is updated.

The firmware images received in the step 304 are transmitted to the cable card (inband_tune_cnf APDU, step 305), so that firmware upgrading of the cable card is executed (step 306). The step 304 continues until firmware upgrading of the cable card is completed (step 307).

The applications that occupy other inband tuners are normally operated while firmware upgrading of the cable card is being executed. For example, referring to FIG. 4, DVR recording, which occupies the first inband tuner (inband tuner #1), and viewing of a corresponding cable channel, which occupies the third inband tuner (inband tuner #3), are normally executed.

In the step 307, it is determined that firmware upgrading of the cable card has been completed if firmware_upgrade_complete APDU is transmitted from the cable card.

If it is determined that firmware upgrading of the cable card has been completed in the step 307, the operation of FIG. 3B is executed. The operation of FIG. 3B will be described later.

Meanwhile, it is determined that the available inband tuner does not exist in the step 303, the inband tuner occupied by the application having the smallest victim priority field value, among the applications that occupy the inband tuners, is selected as the victim inband tuner (step 308). To this end, the host refers to the victim priority field of the inband tuner status matrix of FIG. 5.

For example, it is supposed that the first to third inband tuners (inband tuner #1-#3) are in use, the first inband tuner (inband tuner #1) is occupied by the cable channel, the second inband tuner (inband tuner #2) is occupied by DVR recording, and the third inband tuner (inband tuner #3) is occupied by picture in picture (PIP). Referring to FIGS. 4 and 5, among the cable channel, DVR recording, and PIP, the victim priority field value of PIP is the lowest. Accordingly, the third inband tuner (inband tuner #3) occupied by PIP is selected as the victim inband tuner.

If the victim inband tuner is selected in the step 308, the status of the application that occupies the victim inband tuner is stored (step 309). In other words, status information of PIP in execution is stored. This is to continue the operation of the corresponding application (for example, PIP) after firmware upgrading of the cable card is completed.

If the victim inband tuner is selected through the steps 308 and 309 and the status information of the application being executed by the victim inband tuner is stored, the selected victim inband tuner executes tuning using the frequency transmitted from the cable card to receive the firmware images (step 310). Likewise, corresponding field information of the inband tuner status matrix of FIG. 4 is updated.

The firmware images received in the step 310 are transmitted to the cable card (inband_tune_cnf APDU, step 311), so that firmware upgrading of the cable card is executed (step 312). The step 311 continues until firmware upgrading of the cable card is completed (step 313). In the step 313, it is determined that firmware upgrading of the cable card has been completed if firmware-upgrade_complete APDU is transmitted from the cable card.

If it is determined that firmware upgrading of the cable card has been completed in the step 313, the host returns a control right of the inband tuner to the application selected as the victim application by referring to the application status information stored in the step 309 (step 314). The corresponding inband tuner restores the status of the application selected as the victim application, executes the operation of the corresponding application (steps 315 and 316), and advances to FIG. 3B. For example, if firmware upgrading of the cable card, which is executed through the third inband tuner (inband tuner #3), is completed, the third inband tuner (inband tuner #3) tunes the frequency for PIP by referring to the PIP status information stored in the step 309.

By doing so, in the present invention, it is possible to solve the problem of the related art immediate firmware upgrading method that allows the user to fail to view cable broadcasting (or service) while firmware upgrading is being executed through the inband tuner. Also, it is possible to solve the problem of the related art delayed firmware upgrading method that allows the inband tuner or the OOB channel to be occupied until firmware upgrading of every cable card corresponding to a corresponding broadcasting station is completed.

FIG. 3B is a flow chart illustrating the operation of the host when firmware_upgrade_complete APDU is transmitted from the cable card. Referring to FIG. 3B, the host parses the reset_request_status field value in the firmware_upgrade_complete APDU transmitted from the cable card in order to check whether the immediate reset, the deferred reset, or the no-reset has been requested from the cable card.

For example, if the reset_request_status field value is equal to 0x 00 or 0x01, it is checked that the immediate reset has been requested from the cable card. If the reset_request_status field value is equal to 0x02, it is checked that the no-reset has been requested from the cable card. Also, if the reset_request_status field value is equal to 0x03 or 0x04, it is checked that the deferred reset has been requested from the cable card.

If the immediate reset has been requested from the cable card (step 321), the host immediately reboots the cable card by executing the hard reset or the soft reset regardless of the operation status of the current application (step 325). At this time, if the reset_request_status field value is equal to 0x 00, the host executes the hard reset. If the reset_request_status field value is equal to 0x01, the host executes the soft reset.

If it is checked that the no-reset has been requested from the cable card in the step 321, no reset is executed, whereby the cable card is not rebooted.

Meanwhile, if the deferred reset has been requested from the cable card (step 322), the host checks whether the application affected by rebooting of the cable card exists among the applications that currently occupy the inband tuners (step 323).

If it is determined in the step 323 that there is no application affected by rebooting of the cable card, the host reboots the cable card by executing the reset regardless of the type of the application in operation (step 325).

If it is determined in the step 323 that there are one or more applications affected by rebooting of the cable card, the host defers the reset (step 324) and then reboots the cable card by executing the reset at the time when the operation of the corresponding applications is completed (step 325).

At this time, the host reboots the cable card by executing the hard reset if the reset_request_status field value is equal to 0x03 and executing the soft reset if the reset_request_status field value is equal to 0x04.

Figure 6:
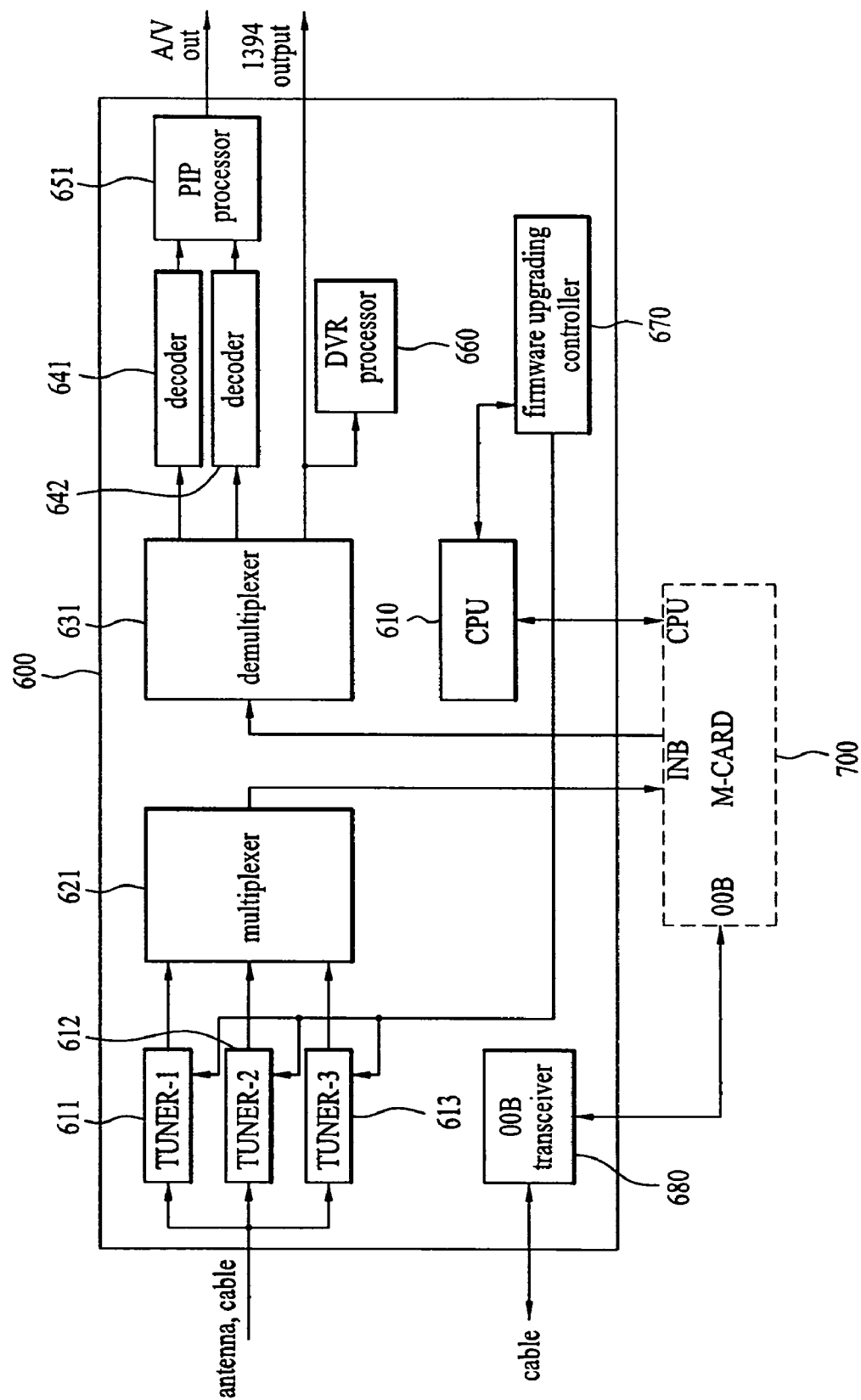
FIG. 6 is a block diagram illustrating configuration of a cable broadcasting receiver according to the preferred embodiment of the present invention.

FIG. 6 is a block diagram illustrating configuration of a cable broadcasting receiver according to the preferred embodiment of the present invention. Referring to FIG. 6, the cable broadcasting receiver according to the present invention includes three inband tuners 611~613, a PIP processor 651 for a PIP function, a DVR processor 660 for a DVR function, a firmware upgrading controller 670, and a bidirectional multiple stream cable card (M-CARD) 700 having a 1394 output terminal.

It is supposed that each of the first to third inband tuners 611~613 includes a demodulator. A demodulation mode of the demodulator depends on a type of a signal received through each tuner. For example, the demodulator demodulates a ground wave broadcasting signal in a vestigial sideband modulation (VSB) mode and cable broadcasting in a QAM mode. P In FIG. 6, a reference numeral 610 denotes a central processing unit (CPU), a reference numeral 621 denotes a multiplexer, a reference numeral 631 denotes a demultiplexer, reference numerals 641 and 642 denote video decoders, and a reference numeral 680 denotes an OOB transceiver. The number of inband tuners or processing ability of the M-CARD and the decoders depend on the cable broadcasting receiver.

In other words, A/V streams, i.e., contents demodulated by being tuned through at least one of the first to third inband tuners 611~613 are multiplexed by the multiplexer 621 and then output to the M-CARD 700. The M-CARD 700 simultaneously descrambles at least one or more contents, and then outputs the descrambled contents to the demultiplexer 631.

If a plurality of contents exist, the demultiplexer 630 divides each content and then divides audio and video streams from each content. The divided video streams are output to the video decoders 641 and 642, so that they are simultaneously decoded by the video decoders.

In the present invention, although the video decoders are exemplarily shown, audio decoders and data decoders may simultaneously decode the audio or data streams.

If the user selects a PIP function, output of a corresponding video decoder of the video decoders 641 and 642 is processed by the PIP processor 650 and then displayed on a screen. If the user selects a recording function, contents divided by the demultiplexer 630 are recorded by the DVR processor 660. At this time, HDD, video tape or DVD may be used as a recording medium.

Furthermore, the contents divided by the demultiplexer 631 may be output to a peripheral device through the 1394 output terminal. In this case, the 1394 output terminal is exemplarily used. This application may be output to the peripheral device through a digital visual interface (DVI) terminal or a high-definition multimedia interface (HDMI) terminal.

Meanwhile, the firmware upgrading controller 670 is to control firmware upgrading of the cable card. In the present invention, the firmware of the cable card is immediately upgraded through the inband tuner.

In other words, the firmware upgrading controller 670 selects an available one of the inband tuners 611~613 and executes firmware upgrading of the cable card through the selected inband tuner.

If there is no available one of the inband tuners 611~613, the firmware upgrading controller 670 selects a victim inband tuner on the basis of importance of various applications which are being executed while occupying the inband tuners. Then, the firmware upgrading controller 670 executes firmware upgrading of the cable card through the selected victim inband tuner.

At this time, if the victim inband tuner is selected, the firmware upgrading controller 670 executes firmware upgrading of the cable card after storing the status of the application which is being executed by the selected victim inband tuner. This is to continue the operation of the application, which is being executed, through the victim inband tuner on the basis of the stored status information of the application after firmware upgrading of the cable card is completed.

In this case, the available inband tuner or the victim inband tuner is selected referring to FIGS. 4 and 5, and has already been described in detail. Therefore, its detailed description will be omitted.

Afterwards, if firmware_upgrade_complete APDU is transmitted from the cable card as firmware upgrading of the cable card is completed, the firmware upgrading controller parses the reset_request_status field value in the firmware_upgrade_complete APDU to check whether the immediate reset, the deferred reset, or the no-reset has been requested from the cable card.

If the immediate reset has been requested from the cable card, the firmware upgrading controller reboots the cable card by immediately executing the reset regardless of the type of the application that currently occupies the inband tuner.

Also, if the deferred reset has been requested from the cable card, the firmware upgrading controller checks whether the application which is being executed while currently occupying the inband tuner is affected by rebooting of the cable card. At this time, if the application is affected by rebooting of the cable card, the firmware upgrading controller defers the reset until the operation of the applications is completed. If the application is not affected by rebooting of the cable card, the firmware upgrading controller immediately executes the reset to reboot the cable card.

If the no-reset has been requested from the cable card, the applications that occupy the inband tuner are normally operated.

As described above, in the preferred embodiment of the present invention, firmware upgrading of the cable card is executed on the cable broadcasting receiver which includes a plurality of inband tuners and multi cards. Since this embodiment is exemplarily described, the present invention is not limited to this embodiment. In other words, firmware upgrading of the cable card may be operated through OOB and DSG. Also, in the present invention, the broadcasting receiver which includes a single tuner or multiple tuners may be operated with a single card or multi cards.

As described above, when firmware upgrading of a single or multi cable card is executed in the cable broadcasting receiver which includes a single tuner or multiple tuners, the operation of the existing functions is not affected while firmware upgrading of the cable card is executed.

As described above, the cable broadcasting receiver and the method for upgrading firmware of a cable card according to the preferred embodiment of the present invention have the following advantages.

The operation of the application which is being executed cannot be affected by firmware upgrading of the cable card.

Particularly, since the reset is deferred depending on the type of the application which is being executed even after firmware upgrading of the cable card is completed, the application, such as viewing of VOD/AOD, pay viewing, and DVR recording, which is provided to the user through the cable broadcasting receiver, can be normally operated.

Accordingly, the cable broadcasting receiver can efficiently maintain the operation of other applications even when firmware upgrading of the cable card is executed.

In the above-explained embodiment of the present invention, the descrambling module is provided to the cable card that is detachably assembled to the host. In this case, a broadcast signal from a broadcasting station (or headend) is descrambled via the descrambling module of the cable card and the descrambled signal is provided to a user.

Alternatively, a descrambling module is provided within a host without a cable card and a broadcast signal from a broadcasting station is descrambled by the descrambling module within the host to be provided to a user. In this case, the descrambling module can be configured to be downloaded from the broadcasting station or the like. In particular, the descrambling module downloaded from the broadcasting station or the like can be differently configured in a manner of being stored in a prescribed memory within the host.

As an example of a method of downloading the descrambling module, a CA (conditional access) image is automatically downloaded from the broadcasting station if a security processor built in the host accesses a network.

Yet, it is apparent that this configurational difference does not change the scope of the appended claims and their equivalents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcasting receiver comprising:
   a plurality of inband tuners; and
   a host controller for selecting one of the inband tuners when a firmware upgrading request is received from a cable card, the selected inband tuner not being occupied with receiving a broadcast content, for receiving firmware images for upgrading the cable card through the selected inband tuner, for transmitting the received firmware images to the cable card, and resetting the cable card according to a reset request which is received from the cable card when firmware images stored on the cable card are upgraded using the firmware images, wherein the host controller delays an implementation of the reset request received from the cable card until all applications receiving a broadcast content through at least one of the plurality of inband tuners that would be affected by a reset have completely been executed when the host controller detects an application that will be affected by a reset is in service.

2. The broadcasting receiver as claimed in claim 1, wherein the reset is either a deferred hard reset or a deferred soft reset.

3. The broadcasting receiver as claimed in claim 1, wherein when a recording application that is being executed while occupying an inband tuner is affected by the reset of the cable card, the host controller resets the cable card by executing the requested reset after the corresponding recording application is completely executed.

4. The broadcasting receiver as claimed in claim 1, wherein the host controller has access to a list of applications that will be affected by resetting the cable card, and the list is updateable to delete or add applications through an external source.

5. The broadcasting receiver as claimed in claim 1, wherein when the firmware upgrading is completed, the cable card determines either an immediate reset or a deferred reset on the basis of importance of the upgraded firmware.

6. The broadcasting receiver as claimed in claim 1, wherein when it is determined that all of the inband tuners are occupied by a recording application that is receiving an AV signal through the inband tuners, the host controller selects an inband tuner on the basis of importance of the recording applications which occupy the inband tuners, and receives the firmware images through the selected inband tuner.

7. A method for upgrading firmware of a broadcasting receiver, which includes a plurality of inband tuners, the method comprising:

(a) receiving firmware images through one of the inband tuners selected for not being occupied with receiving a broadcast content, when a firmware upgrading request is received from a cable card, receiving the firmware images through the selected inband tuner and transmitting the received firmware images to the cable card; and (b) resetting the cable card according to a reset request received from the cable card when firmware images stored on the cable card is upgraded using the firmware images, wherein the host controller delays an implementation of the reset request received from the cable card until all applications receiving a broadcast content through at least one of the plurality of inband tuners that would be affected by a reset have completely been executed when the host controller detects an application that will be affected by a reset is in service.

8. The method as claimed in claim 7, wherein the step (a) includes selecting an inband tuner on the basis of importance of the receiver recording applications which occupy the inband tuners, when it is determined that there is no available inband tuner, and receiving the firmware images through the selected inband tuner.

9. The method as claimed in claim 7, wherein a list of applications that will be affected by resetting the cable card is updateable to delete or add applications through an external source.

10. The method as claimed in claim 7, wherein the reset is either a deferred hard reset or a deferred soft reset.

11. The method as claimed in 7, wherein when a recording application scheduled to be operated for the reset of the cable card exists, the cable card is reset by executing the requested reset after the recording application is completed.

12. A method for upgrading firmware of a cable card in a broadcasting receiver, which includes a host, the method comprising:
   requesting firmware upgrading to the host;
   receiving a firmware image from the host and performing the firmware upgrading on the basis of the received firmware image; and
   determining a deferred reset on the basis of importance of the upgraded firmware and requesting the determined reset to the host, when the firmware upgrading is completed.

13. The method as claimed in claim 12, wherein the deferred reset is either deferred hard reset or deferred soft reset.

14. A digital broadcast receiver, comprising:
   a plurality of inband tuners for receiving digital broadcast signals;
   a receiver main controller for controlling the broadcast receiver and recording applications that record audio and video (AV) signals received through the inband tuners;
   a firmware upgrading controller for controlling the upgrade of a cable card, selecting one of the plurality of inband tuners when an upgrade signal from the cable card is received, the selected inband tuner not being occupied with receiving a broadcast content, receiving an upgrade firmware image through the selected inband tuner, transmitting the firmware image to the cable card, receiving a firmware upgrade complete signal from the cable card when firmware images stored on the cable card has been upgraded using the firmware image, wherein when the firmware upgrade complete signal includes a reset signal requesting a reset comprised of a delayed reset command, the host controller detects whether an application that will be affected by a reset is in service and delays an implementation of the requested reset included in the upgrade complete signal received from the cable card until all applications receiving a broadcast content through at least one of the plurality of inband tuners that would be affected by a reset have completely been executed when the host controller detects an application that will be affected by a reset is in service.

15. The digital broadcast receiver of claim 14, wherein when all the inband tuners are in operation receiving an AV signal due to a recording application, the inband tuner associated with the recording application assigned a highest victim priority value is selected to receive the firmware image for upgrading the cable card.

16. A method for upgrading a cable card by a firmware upgrading controller of a digital broadcast receiver, comprising:
- selecting an inband tuner from a plurality of inband tuners, wherein the selected inband tuner is not being occupied with receiving a broadcast content,
- receiving a firmware image for upgrading the cable card through the selected inband tuner,
- transmitting the firmware upgrade to the cable card,
- receiving a firmware upgrade complete signal from the cable card when firmware images stored on the cable card is upgraded using the firmware image, wherein the firmware upgrade complete signal includes a reset signal requesting a reset, the reset signal comprising a delayed reset command:
- detecting whether an application that will be affected by a reset is in service when the reset signal comprises a delayed reset command affected by the resetting of the cable card have been executed, and
- delaying an implementation of the requested reset included in the upgrade complete signal received from the cable card until all applications receiving a broadcast content through at least one of the plurality of inband tuners that would be affected by a reset have completely been executed when the host controller detects an application that will be affected by a reset is in service.

17. The method of claim 16, wherein when a recording application occupies all of the plurality of inband tuners by receiving a broadcast content through all of the plurality of inband tuners, each recording application has a victim value and the inband tuner associated with the recording application assigned the highest victim value is selected to receive the firmware image for upgrading the cable card.

\* \* \* \* \*